US012409578B2

(12) United States Patent
Tao

(10) Patent No.: US 12,409,578 B2
(45) Date of Patent: Sep. 9, 2025

(54) WOODWORKING GROOVING PLANER

(71) Applicant: Zhenzhen Tao, Zhongxiang (CN)

(72) Inventor: Zhenzhen Tao, Zhongxiang (CN)

( * ) Notice: Subject to any disclaimer, the term of this patent is extended or adjusted under 35 U.S.C. 154(b) by 307 days.

(21) Appl. No.: 18/189,140

(22) Filed: Mar. 23, 2023

(65) Prior Publication Data

US 2024/0316818 A1 Sep. 26, 2024

(51) Int. Cl.
*B27G 17/02* (2006.01)
*B27F 1/04* (2006.01)

(52) U.S. Cl.
CPC ................ *B27G 17/02* (2013.01); *B27F 1/04* (2013.01); *B27G 17/025* (2013.01)

(58) Field of Classification Search
CPC ...... B27F 1/02; B27F 1/04; B27F 1/08; B27F 5/00; B27F 5/02; B27F 5/10; B27G 17/00; B27G 17/02; B27G 17/025; B27G 17/04
See application file for complete search history.

(56) References Cited

U.S. PATENT DOCUMENTS

| | | | | |
|---|---|---|---|---|
| 2,750,973 A * | 6/1956 | Palm | B27G 17/025 30/492 |
| 5,662,440 A * | 9/1997 | Kikuchi | B23Q 1/28 409/137 |
| 7,950,157 B2 * | 5/2011 | Saunders | B27G 17/02 269/53 |
| 2022/0395949 A1 * | 12/2022 | Urig | B23Q 9/0028 |

* cited by examiner

*Primary Examiner* — Matthew Katcoff

(57) ABSTRACT

The present application relates to woodworking tools in general and in particular to a woodworking grooving planer. A woodworking grooving planer comprises a planer body, a planer cutter assembly, a planer cutter lifter, an axial locking mechanism and a radial locking mechanism; the grooving planer lift comprises a rotary leadscrew, a lifting slider, a lifting base, a guide rod and a stopper; rotating the rotatory handle can make the lifting slider drive the cutter assembly to move up or down; the axial locking mechanism and the radial locking mechanism can make the rotary screw thread press the lifting slider axially and radially, so that a close thread fit is established between the rotary screw and the lifting slider, thus effectively avoiding the problem of instability and imprecision caused by pitch clearance.

9 Claims, 8 Drawing Sheets

WOODWORKING GROOVING PLANER

FIELD OF THE INVENTION

The present invention relates to woodworking tools in general and in particular to a woodworking grooving planer.

BACKGROUND OF THE INVENTION

Grooving plane is a special woodworking tool used for making groove structure on workpiece. Please refer to a prior patent document of the applicant (Patent Name: A Woodworking Planer, Application No. CN2022207388268, Publication No. CN217098157U). The prior woodworking planer has the following technical problems:

1. After adjusting and fixing the height of the cutter, size inaccuracy and structural instability may occur because the rotary leadscrew will drive the cutter to slightly shake when forming the groove structure due to the pitch clearance between the rotary leadscrew and the lifting slider.

2. Grooving planer often needs to process the groove structure of the same size at intervals during use. Because it has no size memory function, it needs to adjust the grooving cutter at the same height frequently and repeatedly, which affects the working accuracy and efficiency.

3. The lack of size calibration and reading system on the prior grooving plane is not conducive to the quantitative adjustment of working size and scanning of readings.

4. When the planer cutter is damaged or lost, it needs to be replaced or repaired. During the production process, it often happens that it is different to find suitable spare parts, which affects the working efficiency.

SUMMARY OF THE INVENTION

Considering the above problems, this application discloses a woodworking planer to solve all or part of the technical problems described in the Background of the Invention section.

In order to achieve the above goals, the present invention adopts the following solutions:

A woodworking grooving planer, comprising:

- a planer body, equipped with a handle, a planing groove and a planing surface, wherein the planing groove penetrates through the planer body and is open on the planing surface;
- the grooving cutter assembly comprising a grooving cutter and a cutter shaft, which are integrally formed or fixedly connected;
- the cutter lifter having a rotary leadscrew and a lifting slider, wherein the said rotary leadscrew can be rotatably arranged on the planer body, and the lifting slider is arranged on the rotary leadscrew rod through threaded connection, and can drive the lifting slider to move up or down when the rotary leadscrew rod rotates;
- The grooving cutter assembly is arranged on the lifting slider, and can synchronously ascend or descend along with the lifting slider to adjust the working depth;
- the axial locking mechanism, used for locking the threaded connection between the rotary leadscrew and the lifting slider from the axial direction of the rotary leadscrew;
- the radial locking mechanism, used for locking the threaded connection between the rotary leadscrew and the lifting slider from the radial direction of the rotary leadscrew, and also for locking the rotatable connection between the rotary leadscrew and the planer body.

Preferably, the cutter lifter further comprises a lifting base fixedly arranged on the planer body, a guide rod, one end of which is fixedly arranged on the lifting base and a stopper fixedly arranged on one end of the guide rod which is opposite to the lifting base. The rotary leadscrew can be rotatably arranged on the lifting base and the stopper, and the lifting slider is located between the lifting base and the stopper.

Preferably, the woodworking grooving planer further comprises a size locking mechanism having a locking sleeve which can be slidably sleeved on the guide rod and equipped with a screw hole, a locking shaft arranged on the locking sleeve through threaded connection, and a locking handle, one end of which is fixed on the locking shaft or integrally formed with the locking shaft; Rotating the locking handle can make the locking shaft push against or release the guide rod.

Preferably, the woodworking grooving planer further comprises a zero-point calibration mechanism, wherein the zero-point calibration mechanism has a calibrator provided with a screw hole and a locking screw arranged on the calibrator through thread fit; Tightening or loosening the locking screw can fix the calibrator on the lifting base or release it from the lifting base. Further preferably, the calibrator is provided with a connector and a size pointer, wherein the connector is used to assemble the calibrator on the lifting base, and the size pointer is used to indicate the working depth. Screw holes for assembling locking screws are arranged on the connector of the calibrator.

Preferably, one end of the grooving cutter used for connecting the cutter shaft is provided with an axial cutter shaft hole whose side wall is provided with a radial cutter shaft locking hole; One end of the cutter shaft used for connecting the grooving cutter is provided with an axial locking head which is provided with a radial grooving cutter locking hole; The axial locking head is arranged in the axial cutter shaft hole, and the radial cutter shaft locking hole is aligned with the radial grooving cutter locking hole, and a fixed connection is established between the grooving cutter and the cutter shaft by fasteners and the cooperation between the radial cutter shaft locking hole and the radial grooving cutter locking hole. Or, the face of one end of the grooving cutter used for connecting the cutter shaft is provided with a mosaic structure and an axial cutter shaft locking hole; The end face of the cutter shaft used for connecting one end of the grooving cutter is provided with an mosaic coordination structure and an axial grooving cutter locking hole; The mosaic structure and the mosaic coordination structure are connected in a mosaic way, and a fixed connection is established between the grooving cutter and the cutter shaft by fasteners and the cooperation between the axial cutter shaft locking hole and the axial cutter locking hole.

Preferably, the woodworking grooving planer further comprises a standby cutter assembly having a standby cutter magazine and a standby grooving cutter, while the cutter magazine is arranged on the planer body, and the standby grooving cutter is arranged in the standby cutter magazine.

Preferably, the woodworking grooving planer further comprises a fence assembly, wherein the fence assembly comprises a fence panel, a fence shaft, a fence seat and a fence adjusting screw, and the fence seat is provided with a fence shaft hole and a fence shaft locking hole; The fence seat is fixed on the planer body, the fence shaft is assembled in the fence shaft hole, the fence panel is fixed on the fence shaft, and the fence adjusting screw is assembled in the fence shaft locking hole, so that the fence shaft can be locked or loosened by screwing or unscrewing the fence shaft locking hole.

Preferably, the axial locking mechanism is a spring, a spring tab or a glass bead plunger, an axial locking assembly structure is arranged on the planer body, and the spring, spring tab or the glass bead plunger is arranged in the axial locking assembly structure.

Preferably, the radial locking mechanism comprises a radial locking screw and a radial locking spring, and the lifting base is provided with a radial locking screw hole; A radial locking screw cap and a radial locking screw rod are arranged on the radial locking screw, the radial locking screw is assembled in the radial locking screw hole, and the radial locking spring is sleeved on the radial locking screw rod; Tightening or loosening the radial locking screw can lock or loosen the threaded connection between the rotary leadscrew and the lifting slider, and can lock or loosen the rotatable connection between the rotary leadscrew and the planer body.

Compared with the prior art, the invention has the following advantages and positive effects:

1. when in use, the rotary leadscrew is unlocked by rotating the radial locking screw, the grooving cutter is adjusted to the required working depth by rotating the handle, which corresponds to the depth of the target groove to be planed, and then the rotary leadscrew is locked by rotating the radial locking screw. then, the fence panel is adjusted and fixed according to the actual condition of the workpiece. finally, the required groove structure can be produced on the workpiece by pushing the grooving planer on the workpiece through the handle.

2. This application adopts an axial and radial bidirectional locking solution to solve the instability and imprecision caused by the pitch clearance between the rotary leadscrew and the lifting slider, which is helpful to improve the stability of the equipment and improve the working accuracy.

3. According to the invention, a size locking mechanism is arranged one the grooving planer, so that the frequently used working depth can be memorized through the size locking mechanism, and the working depth can be quickly and accurately adjusted in place when in use, thus avoiding the problem that the same working depth needs to be adjusted repeatedly during use.

4. This application provides a zero-point calibration mechanism for the planer, by which the working depth can be quantitatively adjusted and the readings can be scanned conveniently.

5. This application provides a standby grooving cutter assembly for the grooving planer, so that the cutter can be easily replaced when the grooving cutter is damaged or lost, which is conductive to improving the working efficiency.

6. In this application, the fence assembly is provided for the grooving planer, by which the cutter can be fed and retracted quickly and accurately, which is helpful to improve the working speed and ensure the accuracy of the groove structure.

NOTES TO LEGENDS

Figure 1:
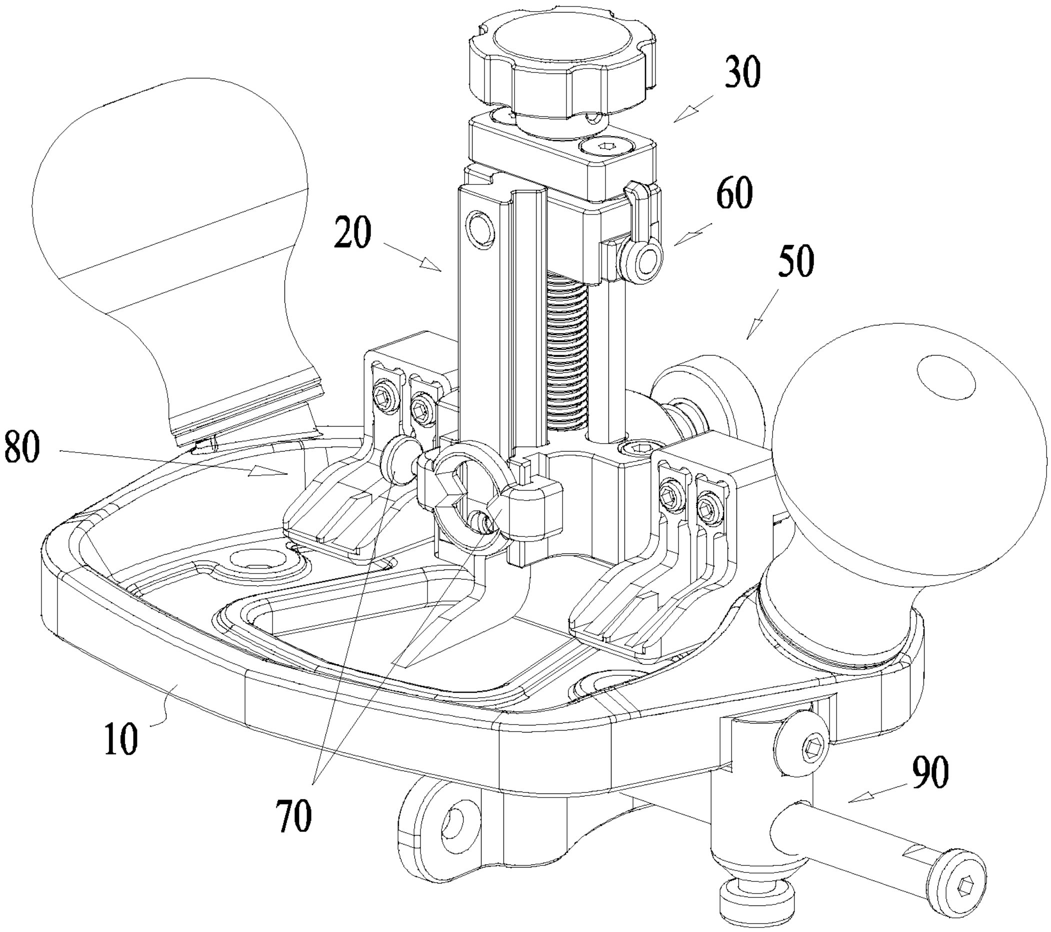
FIG. 1: Overall Assembly of Woodworking Grooving Planer.
Figure 2:
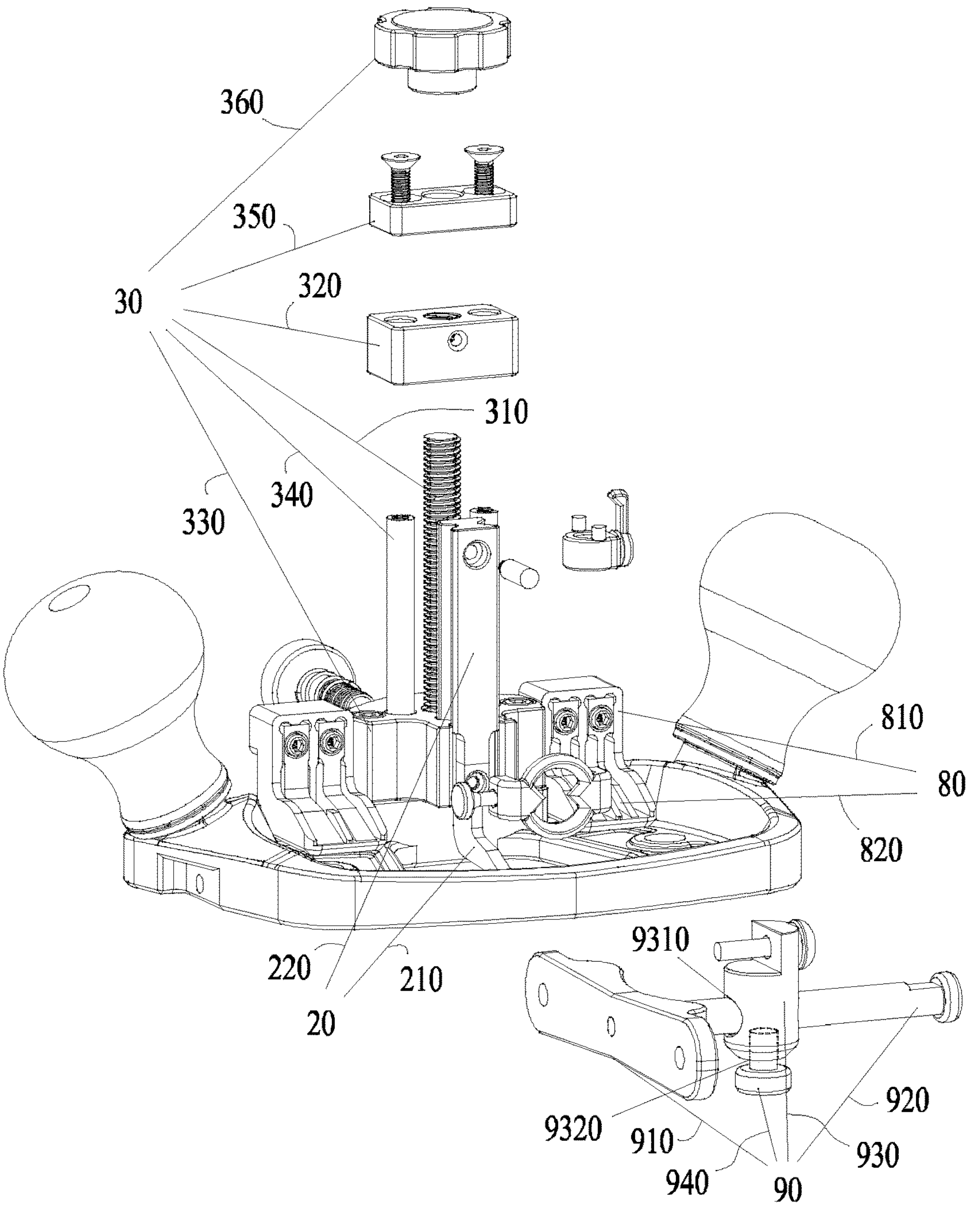
FIG. 2: 1st Dimension Explosion of Woodworking Grooving Planer.
Figure 3:
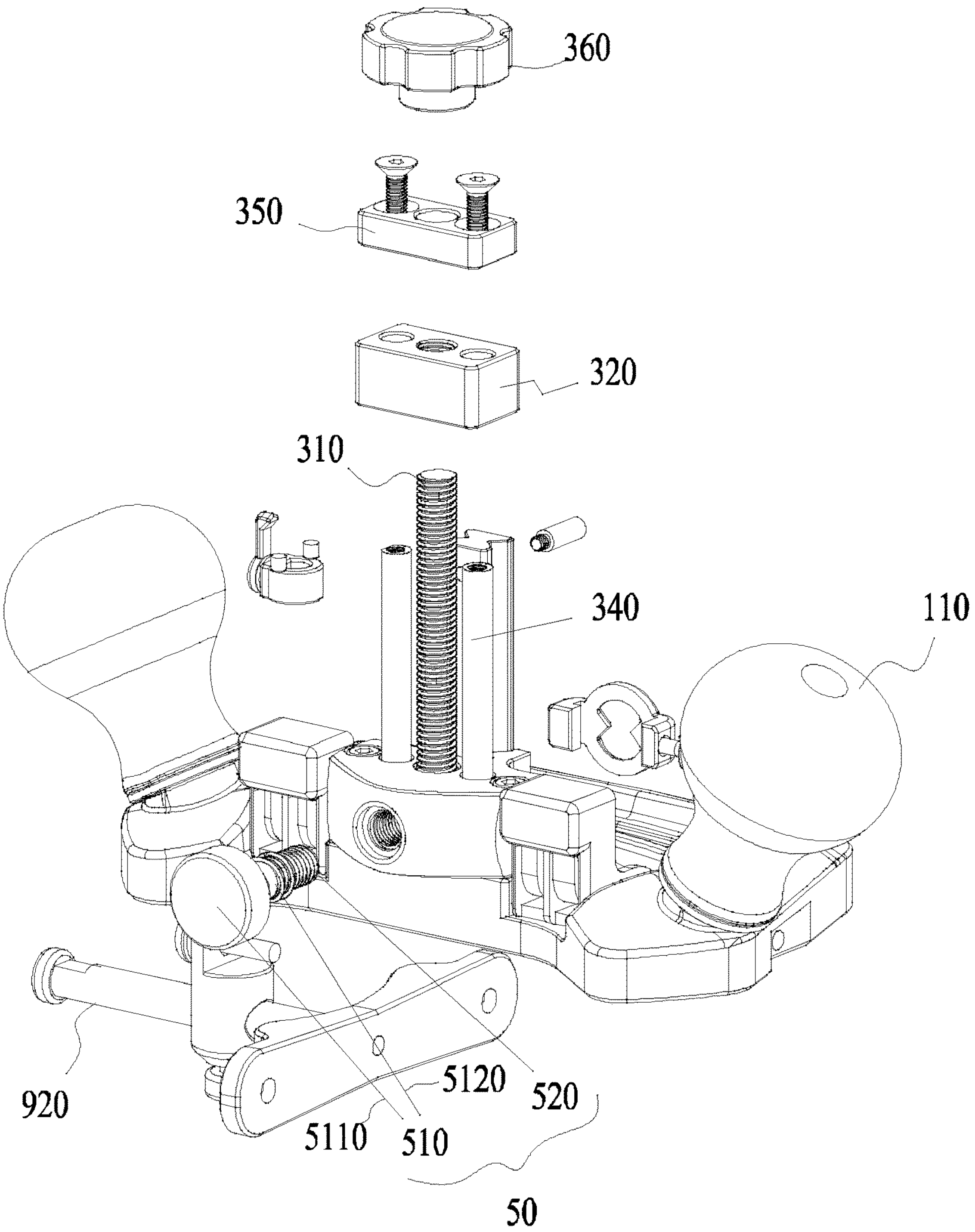
FIG. 3: 2nd Dimension Explosion of Woodworking Grooving Planer.
Figure 4:
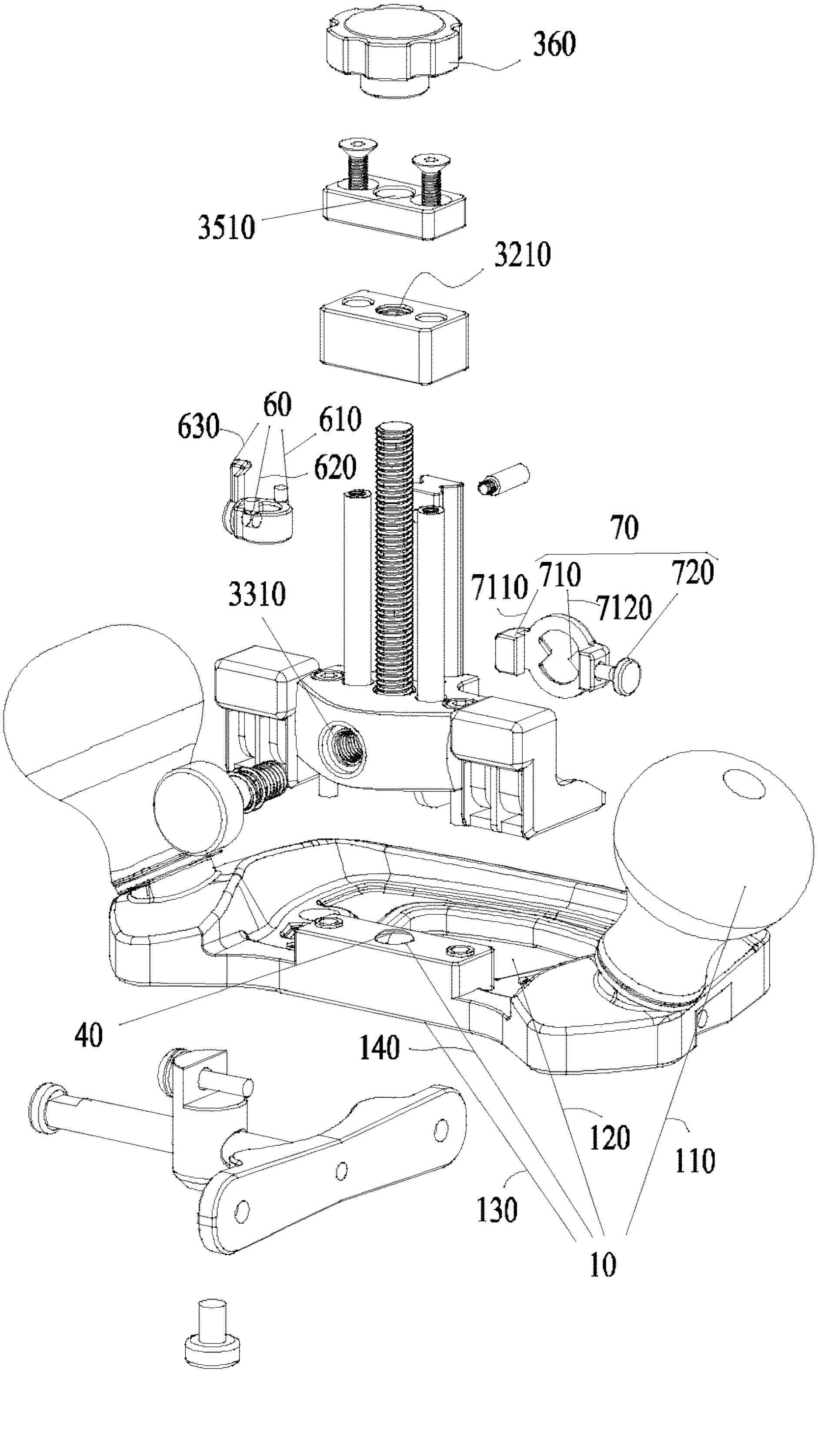
FIG. 4: 2nd Dimension Depth Explosion of Woodworking Grooving Planer.

10—Grooving planer; 20—Grooving cutter assembly; 30—Grooving cutter lifter; 40—Axial locking mechanism; 50—Radial locking mechanism; 60—Size locking mechanism; 70—zero—point calibration mechanism; 80—Standby cutter assembly; 90—Fence assembly;

110—Handle; 120—Planing groove; 130—Planing surface; 140—Axial locking assembly structure;

210—Grooving cutter; 220—Cutter shaft;

2110—Axial cutter shaft hole; 2120—Radial cutter shaft locking hole; 2130—Mosaic structure; 2140—Axial cutter shaft locking hole;

2210—Axial locking head; 2220—Radial cutter locking hole; 2230—Mosaic coordination structure; 2240—Axial cutter locking hole;

310—Rotary leadscrew; 320—Lifting slider, 330—Lifting base; 340—Guide rod; 350—Stopper; 360—Rotary handle;

3110—Screw plug;

3210—Drive screw hole;

3310—Radial locking screw hole; 3320—Screw countersunk hole; 3330—Guide rod countersunk hole; 3340—Base assembly hole;

3410—Guide rod plug; 3420—Axial guide rod fixing hole;

3510—Screw through hole; 3520—guide rod countersunk through hole;

510—Radial locking screw; 520—Radial locking spring;

5110—Radial locking screw cap; 5120—Radial locking screw;

610—Locking sleeve; 620—locking shaft; 630—Locking handle;

710—Calibrator; 720—Locking screw;

7110—Connector; 7120—Size pointer;

810—Standby cutter magazine; 820—Standby grooving cutter;

910—Fence panel; 920—Fence shaft; 930—Fence seat; 940—Fence adjusting screw;

9310—Fence shaft hole; 9320—Fence shaft locking hole.

DETAILED DESCRIPTION OF EMBODIMENTS

Figure 5:
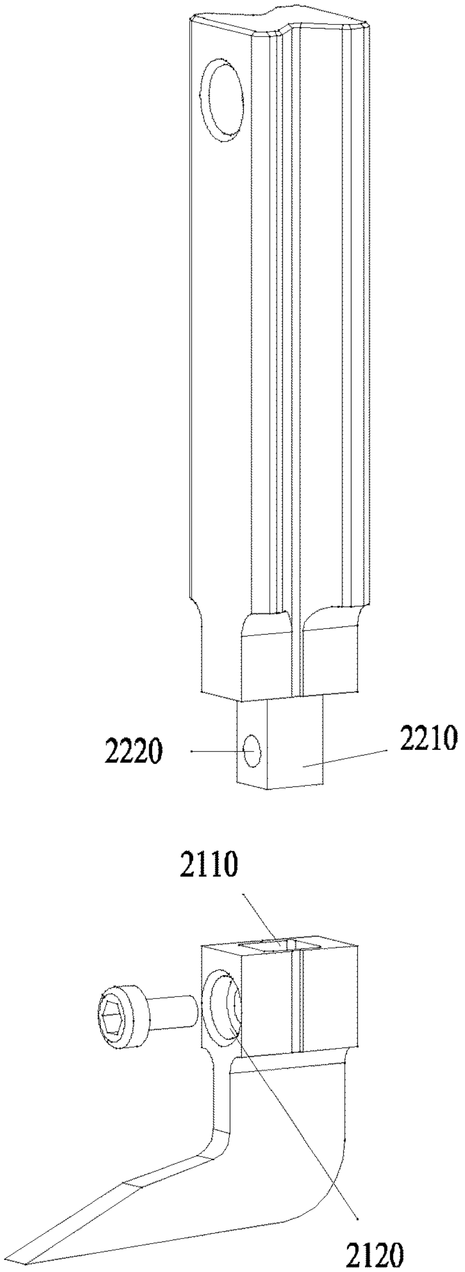
FIG. 5: Schematic Structure of Grooving Cutter Assembly of the First Preferred Embodiment.
Figure 6:
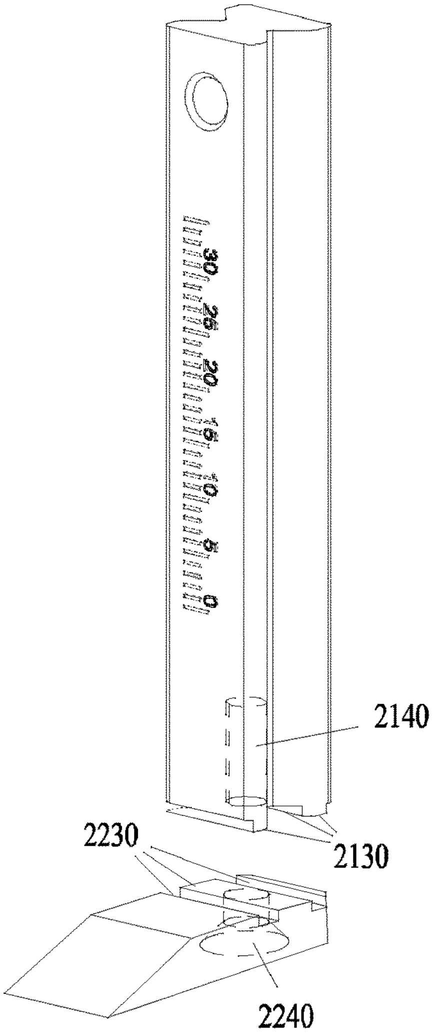
FIG. 6 Schematic Structure of Grooving Cutter Assembly of the Second Preferred Embodiment.

Please refer to FIGS. 1-8. The woodworking grooving planer disclosed in this application comprises the following components, assemblies or mechanisms:

a planer body 10 made of metal material and having a handle 110, a planing groove 120 and a planing surface 130. The planing groove 120 penetrates the planer body 10 and is open on the planing surface 130. The handle 110 are symmetrically arranged on both sides of the planer body 10, and the groove 120 is arranged in the middle of the planer body 10, and the planing surface 130 is a plane. The handle 110 is used to operate the planer, the planing groove 120 is used to accommodate the grooving cutter 210 on the grooving cutter assembly 20, and the planing surface 130 is used to contact the workpiece to be planed.

a grooving cutter assembly 20 comprising a grooving cutter 210 and a cutter shaft 220, and the grooving cutter 210 and the cutter shaft 220 are integrally formed or fixedly connected. The grooving cutter assembly 20 can adopt the specific structure shown in FIG. 5 or FIG. 6. Referring to FIG. 5, a feasible scheme of the grooving cutter assembly 20 of the present application is as follows: one end of the grooving cutter 210 used for connecting the cutter shaft 220 is provided with an axial cutter shaft hole 2110, and the side wall of the axial cutter shaft hole 2110 is provided with a radial cutter shaft locking hole 2120; One end of the cutter shaft 220 for connecting the grooving cutter 210 is provided with an axial locking head 2210, and the axial locking head 2210 is provided with a radial grooving cutter locking hole 2220; The axial locking head 2210 is arranged in the axial cutter shaft hole 2110, and the radial cutter shaft locking hole 2120 is aligned with the radial grooving cutter locking hole 2220. A fixed connection is established between the grooving cutter 210 and the cutter shaft 220 by common fasteners (e.g., screws) and the cooperation between the radial cutter shaft locking hole 2120 and the radial grooving cutter locking hole 2220. Referring to FIG. 6, another feasible scheme of the grooving cutter assembly 20 of the present application is that the face of one end of the grooving cutter 210 for connecting the cutter shaft 220 is provided with a mosaic structure 2130 and an axial cutter shaft locking hole 2140; The end face of the cutter shaft 220 used for connecting one end of the grooving cutter 210 is provided with a mosaic coordination structure 2230 and an axial grooving cutter locking hole 2240; The mosaic structure 2130 and the mosaic coordination structure 2230 are connected in a mosaic way, and the grooving cutter 210 and the cutter shaft 220 are fixedly connected through by common fasteners (e.g. screws) and the cooperation between the axial cutter shaft locking hole 2140 and the axial grooving cutter locking hole 2240. The mosaic structure 2130 may be a mosaic groove and/or a mosaic protrusion, and the mosaic coordination structure 2230 may be a mosaic structure (a mosaic protrusion and/or a mosaic groove) that is complementary to the mosaic structure 2130. Another feasible scheme of the grooving cutter assembly 20 of the present application is that the grooving cutter 210 and the cutter shaft 220 can be machined using the same material.

The grooving cutter assembly 20 is fixed to the lifting slider 320 by common fixed connection means such as screw connection, buckle connection, welding, etc. The grooving cutter 210 partially or completely protrudes from the planing surface 130, and the depth of the target groove to be planed or the working depth can be adjusted by adjusting the extent to which the grooving cutter 210 extends from the planing surface 130.

A grooving cutter lifter 30 comprises a rotary leadscrew 310, a lifting slider 320, a lifting base 330, a guide rod 340, a stopper 350 and a rotary handle 360. The lifting base 330 is fixedly arranged on the planer body 10 by means such as screw connection, welding or integral molding. One end of the guide rod 340 is fixedly arranged on the lifting base 330, and the stopper 350 is fixedly arranged on the end of the guide rod 340 opposite to the lifting base 330. The rotary leadscrew 310 is rotatably arranged on the lifting base 330 and the stopper 350, and the lifting slider 320 is arranged on the rotary leadscrew 310 through threaded connection, and located between the lifting base 330 and the stopper 350. The grooving cutter assembly 20 is arranged on the lifting slider 320. When the rotary leadscrew 310 rotates, it can drive the lifting slider 320 to rise or fall, and then drive the grooving cutter assembly 20 to synchronously rise or fall to adjust the working depth.

Figure 8:
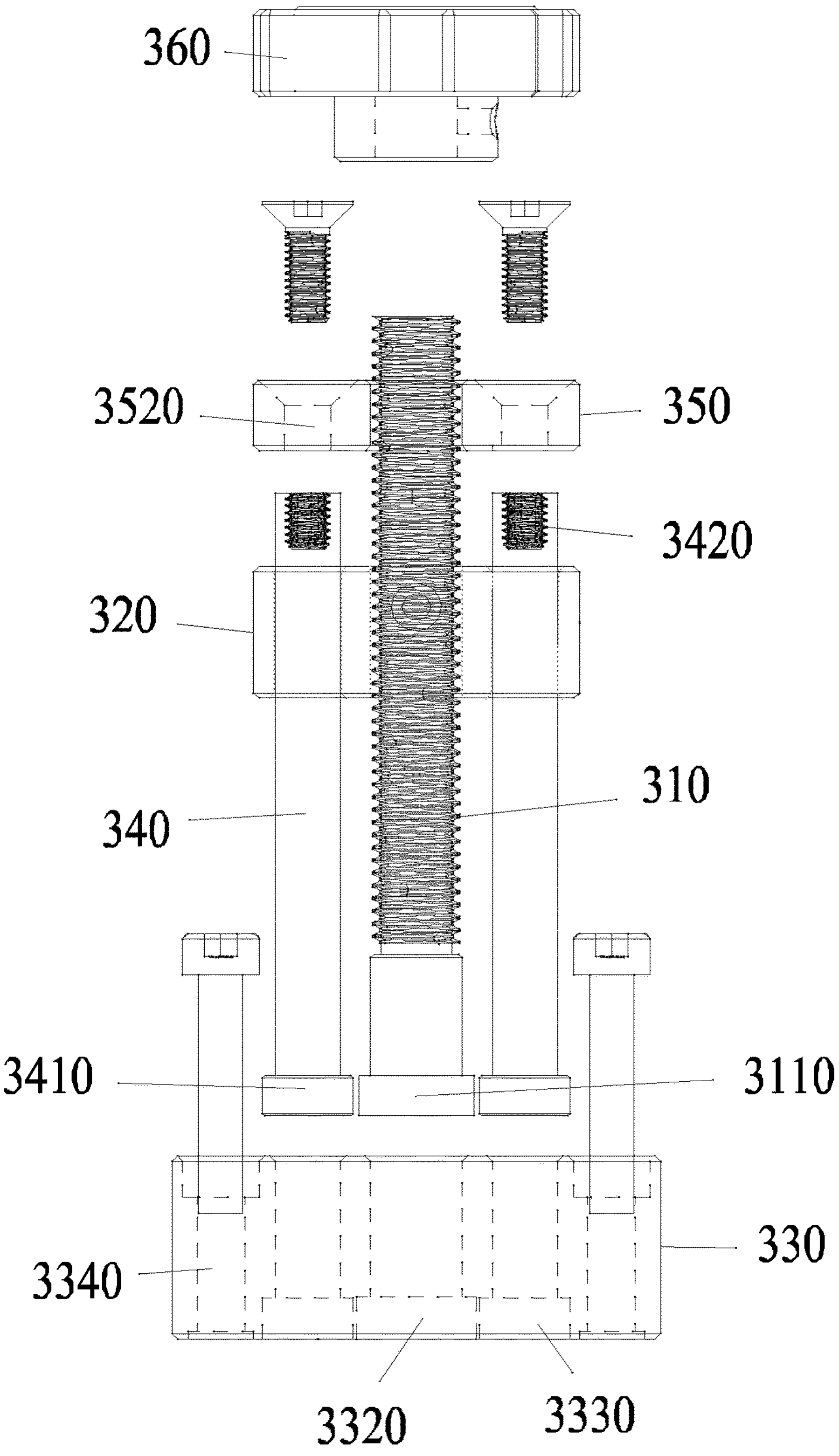
FIG. 8: Assembly Relationship of Grooving Cutter Lifter.

Please refer to FIG. 8 for the specific assembly relationship between the rotary leadscrew 310, the lifting slider 320, the lifting base 330, the guide rod 340, the stopper 350 and the rotary handle 360. The lifting base 330 is provided with a screw countersunk hole 3320 and a guide rod countersunk hole 3330 for assembling the rotary screw 310 and the guide rod 340. The stopper 350 is provided with a screw through hole 3510 through which the rotary leadscrew 310 can pass and be accommodated, and a guide rod countersunk through hole 3520 through which the guide rod 340 can pass and be accommodated. One end of the rotary leadscrew 310 used for matching with the screw countersunk hole 3320 is provided with a screw plug 3110. A guide rod plug 3410 is arranged at one end of the guide rod 340 used for matching with the guide rod countersunk hole 3330, and an axial guide rod fixing hole 3420 is arranged at the end of the guide rod 340 opposite to the guide rod plug 3410.

The lifting base 330 is fastened to the planer body 10 by the screw assembly hole on the planer body 10, the base assembly hole 3340 on the lifting base 330 and screws or bolts. The screw plug 3110 is arranged in the screw countersunk hole 3320 to form a rotatable connection, and can prevent the rotary screw 310 from falling off the lifting base 330. The end of the rotary leadscrew 310 that is opposite to the screw plug 3110 passes through the screw through hole 3510 and is screwed to the rotary handle 360. The guide rod plug 3410 is arranged in the guide rod countersunk hole 3330 on the lifting base 330, and one end of the guide rod 340 with the axial guide rod fixing hole 3420 passes through the guide rod countersunk hole 3520 and is fixed on the stop 350 by a cap screw. A drive screw hole 3210 is arranged in the lifting slider 320, and the lifting slider 320 is arranged on the rotary leadscrew 310 through the cooperation between the drive screw hole 3210 and the thread on the rotary leadscrew 310.

An axial locking mechanism 40, used for locking the threaded connection between the rotary leadscrew 310 and the lifting slider 320 from the axial direction of the rotary leadscrew 310. The axial locking mechanism 40 applies pressure to the rotary leadscrew 310 from the axial direction of the rotary leadscrew 310, and can adopt a supporting member such as a screw, or a spring, a spring tab or a glass bead plunger. In this embodiment, the glass bead plunger is used as the axial locking mechanism 40, and the planer body 10 is provided with an axial locking assembly structure 140, in which the glass bead plunger is arranged to provide an axial elastic force for locking the rotary leadscrew 310, and the axial locking assembly structure 140 is specifically a screw hole.

A radial locking mechanism 50, used to lock the threaded connection between the rotary leadscrew 310 and the lifting slider 320 from the radial direction of the rotary leadscrew 310, and also to lock the rotatable connection between the rotary leadscrew 310 and the planer body 10 and the lifting base 330. The radial locking mechanism 50 includes a radial locking screw 510 and a radial locking spring 520. The lifting base 330 is provided with a radial locking screw hole 3310; The radial locking screw 510 is provided with a radial locking screw cap 5110 and a radial locking screw rod 5120. The radial locking screw rod 5120 is fitted in the radial locking screw hole 3310, and the radial locking spring 520 is sleeved on the radial locking screw rod 5120. Tightening or loosening the radial locking screw 510 can lock or loosen the threaded connection between the rotary leadscrew 310 and the lifting slider 320, and also lock or loosen the rotatable connection between the rotary leadscrew 310 and the lifting base 330.

Figure 7:
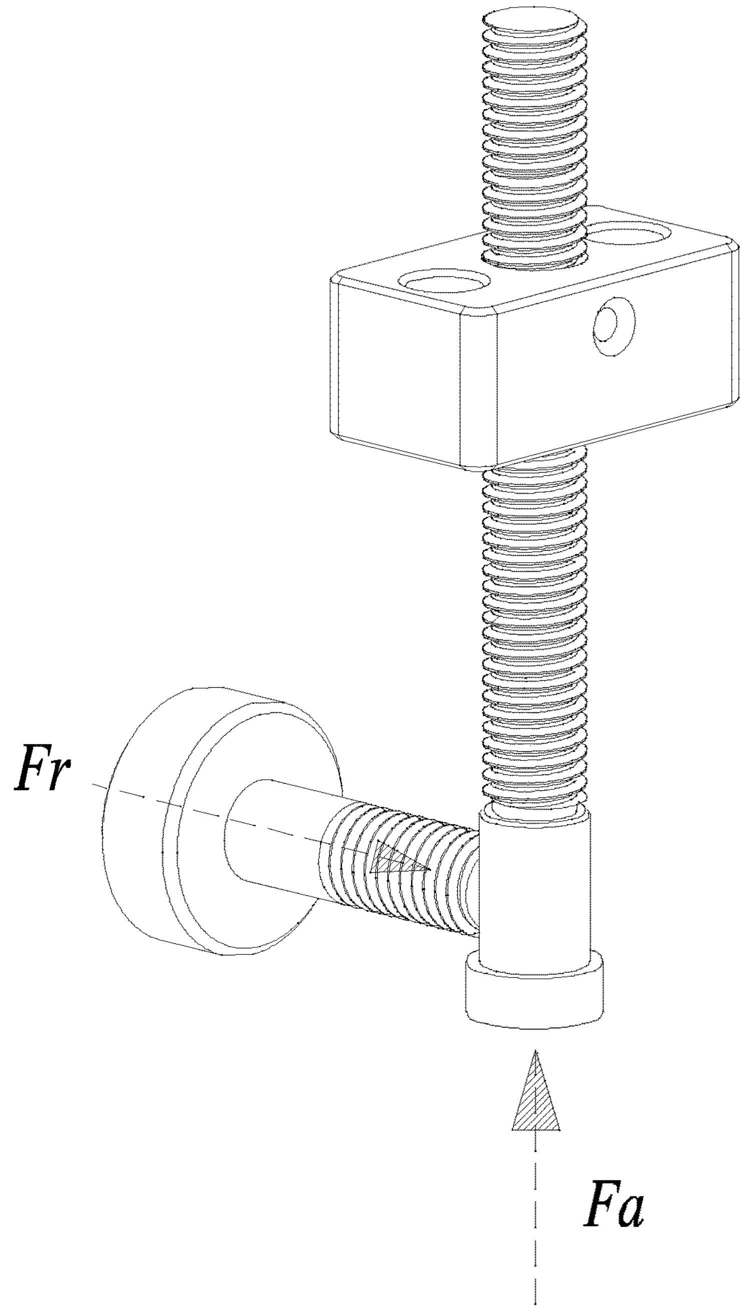
FIG. 7: Schematic Diagram of Bidirectional Locking Principle of Woodworking Grooving Planer.

Please refer to FIG. 7. In order to solve the instability and imprecision caused by the pitch clearance between the rotary leadscrew 310 and the lifting slider 320, this application adopts an axial and radial bidirectional locking solution, with which the elastic locking force Fr is applied from the axial direction of the rotary leadscrew 310 through the axial locking mechanism 40, and the screw rod locking force Fa is applied from the radial direction of the rotary leadscrew 310 through the radial locking mechanism 50. The thread of the rotary lead screw 310 can press the thread of the lifting slider 320 from the axial direction and the radial direction, so that the threads can fit closely, thus effectively avoiding the problem of instability and imprecision caused by pitch clearance.

In a changed embodiment of the present application, the woodworking grooving planer further comprises a size locking mechanism 60 having a locking sleeve 610, a locking shaft 620 and a locking handle 630; The locking sleeve 610 is slidably sleeved on the guide rod 340, and the locking sleeve 610 is provided with a screw hole, and the locking shaft 620 is arranged on the locking sleeve 610 through threaded fit, and one end of the locking handle 630 is fixed on or integrally formed with the locking shaft 620; Rotating the locking handle 630 can make the lock shaft 620 press against or release the guide rod 340. When the same workpiece is often machined at the same size, the size locking mechanism 60 can be adjusted and fixed at the corresponding position on the guide rod 340, which can effectively improve the adjustment efficiency of the working depth.

In a changed embodiment of the present application, the woodworking grooving planer further comprises a zero-point calibration mechanism 70 having a calibrator 710 and a locking screw 720, and the calibrator 710 is provided with a connector 7110 and a size pointer 7120. The connector 7110 is provided with a screw hole, and the locking screw 720 is provided on the connector 7110 through threaded fit. The connector 7110 is used to assemble the calibrator 710 on the lifting base 330, and the size pointer 7120 is used to indicate the working depth. Tightening or loosening the locking screw 720 can fix the calibrator 710 on the lifting base 330 or release it from the lifting base 330. The use of the zero-point calibration mechanism 70 can conveniently allow for quantitative adjustment of working depth and the scanning of readings.

In a changed embodiment of the present application, the woodworking grooving planer further comprises a standby cutter assembly 80 having a standby cutter magazine 810 and a standby grooving cutter 820; The standby cutter magazine 810 is fixedly assembled on the planer body 10, and the standby grooving cutter 820 is fixed in the cutter magazine 810 by screw connection or snap connection. A standby cutter assembly 80 is provided for the woodworking grooving planer, which is convenient for replacing the cutter when in use and is beneficial to improving the working efficiency.

In a changed embodiment of the present application, the woodworking grooving planer further comprises a fence assembly 90 having a fence panel 910, a fence shaft 920, a fence seat 930 and a fence adjusting screw 940, and the fence seat 930 is provided with a fence shaft hole 9310 and a fence shaft locking hole 9320. The fence seat 930 is fixed on the planer body 10, the fence shaft 920 is assembled in the fence shaft hole 9310, the fence panel 910 is fixed on the fence shaft 920, and the fence adjusting screw 940 is assembled in the fence shaft locking hole 9320. Tightening or loosening the fence adjusting screw 940 can lock or loosen the fence shaft 920.

Description of Working Principle and Effect:

1. The rotary leadscrew 310 is unlocked by rotating the radial locking screw 510, the grooving cutter 210 is adjusted to the required working depth by rotating the handle 360, which corresponds to the depth of the target groove to be planed, and then the rotary leadscrew 310 is locked by rotating the radial locking screw 510. Then, the fence panel 910 is adjusted and fixed according to the actual condition of the workpiece. Finally, the planer is pushed on the workpiece by using the handle 110 to form the required groove structure on the workpiece.

2. This application adopts a axial and radial bidirectional locking solution to solve the instability and imprecision caused by the pitch clearance between the rotary leadscrew 310 and the lifting slider 320, which is helpful to improve the stability of the equipment and improve the working accuracy.

3. The present application provides a size locking mechanism 60 for the grooving planer, so that the frequently used working depth can be memorized through the size locking mechanism 60, and the working depth can be quickly and accurately adjusted in place when in use, thus avoiding the problem that the account and working depth needs to be adjusted repeatedly during use.

4. This application provides a zero-point calibration mechanism 70 for the planer, by which the working depth can be quantitatively adjusted and the readings can be scanned conveniently.

5. This application provides a standby grooving cutter assembly 80 for the grooving planer, so that the cutter can be easily replaced when the grooving cutter 210 is damaged or lost, which is conductive to improving the working efficiency.

6. This application provides a fence assembly 90 for the grooving planer, by which the cutter can be fed and retracted quickly and accurately, which is helpful to improve the working speed and ensure the accuracy of the groove structure.

What is mentioned above is only intended to describe the preferred embodiments of the present invention, but not to limit other forms of the present invention, and those skilled in the art may be able to make various modifications and improvements to produce an equivalent embodiment in other fields by using the technical solution disclosed in the present invention, and any simple modification, equivalent change and improvement to the above embodiments according to the technical essence of the present invention still fall within the scope of protection of the technical solution adopted by the present invention.

I claim:

1. A woodworking grooving planer, comprising:

a planer body, provided with a handle, a planing groove and a planing surface; wherein the planing groove penetrates through the planer body and opens on the planing surface;

a grooving cutter assembly, comprising a grooving cutter and a cutter shaft; wherein the grooving cutter and the cutter shaft are integrally formed or fixedly connected;

a cutter lifter, comprising a rotary leadscrew and a lifting slider;

wherein the rotary leadscrew is rotatably arranged on the planer body, and the lifting slider is arranged on the rotary leadscrew through a threaded connection; when the rotary leadscrew rotates, it drives the lifting slider to move up or down; and the grooving cutter assembly is fixed to the lifting slider and moves up or down synchronously with the lifting slider to adjust a working depth;

an axial locking mechanism, configured for locking the threaded connection between the rotary leadscrew and the lifting slider from an axial direction of the rotary leadscrew; and a radial locking mechanism, configured for locking the threaded connection between the rotary leadscrew and the lifting slider from a radial direction of the rotary leadscrew, and also configured for locking a rotatable connection between the rotary leadscrew and the planer body;

wherein the cutter lifter further comprises a lifting base, a guide rod, and a stopper; the lifting base is fixedly arranged on the planer body, one end of the guide rod is fixedly arranged on the lifting base, and the stopper is fixedly arranged on the guide rod at one end opposite to the lifting base; and wherein the rotary leadscrew is rotatably arranged on the lifting base and the stopper, and the lifting slider is located between the lifting base and the stopper.

2. The woodworking planer of claim 1, wherein:

the woodworking grooving planer further comprises a size locking mechanism comprising a locking sleeve, a locking shaft and a locking handle;

the locking sleeve is slidably sleeved on the guide rod, the locking sleeve is provided with screw holes, the locking shaft is arranged on the locking sleeve through the threaded connection, and one end of the locking handle is fixed on the locking shaft or integrally formed with the locking shaft; rotating the locking handle makes the locking shaft push against or release the guide rod.

3. The woodworking planer of claim 1, wherein:

the woodworking grooving planer further comprises a zero-point calibration mechanism having a calibrator and a locking screw, wherein the calibrator is provided with a screw hole, and the locking screw is arranged on the calibrator through a thread fit; and tightening or loosening the locking screw makes the calibrator be fixed on the lifting base or be released it from the lifting base.

4. The woodworking planer of claim 3, wherein:

the calibrator is provided with a connector used to assemble the calibrator on the lifting base, and a size pointer used to indicate the working depth.

5. The woodworking planer of claim 1, wherein:

the radial locking mechanism comprises a radial locking screw and a radial locking spring, and the lifting base is provided with a radial locking screw hole;

the radial locking screw is provided with a radial locking screw cap and a radial locking screw rod assembled in the radial locking screw hole, and the radial locking spring is sleeved on the radial locking screw rod;

tightening or loosening the radial locking screw allows locking or loosening the threaded connection between the rotary leadscrew and the lifting slider, and also locking or loosening the rotatable connection between the rotary leadscrew and the planer body.

6. The woodworking planer of claim 1, wherein:

one end of the grooving cutter used for connecting the cutter shaft is provided with an axial cutter shaft hole, a sidewall of which is provided with a radial cutter shaft locking hole;

one end of the cutter shaft used for connecting the grooving cutter is provided with an axial locking head provided with a radial cutter locking hole;

the axial locking head is arranged in the axial cutter shaft hole and the radial cutter shaft locking hole is aligned with the radial cutter locking hole, and the grooving cutter and the cutter shaft are fixedly connected by fasteners and a cooperation between the radial cutter shaft locking hole and the radial cutter locking hole; or, one end face of the cutter used for connecting one end of the cutter shaft is provided with a mosaic structure and an axial cutter shaft locking hole;

one end face of the cutter shaft used for connecting one end of the grooving cutter is provided with a mosaic coordination structure and an axial cutter locking hole; and the mosaic structure and the mosaic coordination structure are connected in a mosaic way, and a fixed connection is established between the grooving cutter and the cutter shaft by the fasteners and the cooperation between the axial cutter shaft locking hole and the axial cutter locking hole.

7. The woodworking planer of claim 1, wherein:

the woodworking grooving planer further comprises a standby cutter assembly having a standby cutter magazine and a standby grooving cutter; and the cutter magazine is arranged on the planer body, and the standby grooving cutter is arranged in the standby cutter magazine.

8. The woodworking planer of claim 1, wherein:

the woodworking planer further comprises a fence assembly, which comprises a fence panel, a fence shaft, a fence seat provided with a fence shaft hole and a fence shaft locking hole, and a fence adjusting screw; and the fence seat is fixed on the planer body, the fence shaft is assembled in the fence shaft hole, the fence panel is fixed on the fence shaft, and the fence adjusting screw is assembled in the fence shaft locking hole.

9. The woodworking planer of claim 1, wherein:

the axial locking mechanism is a spring, a spring tab or a glass ball plunger, and the planer body is provided with an axial locking assembly structure in which the spring, spring tab, or glass ball plunger is arranged.

* * * * *